(12) United States Patent
Schlichter et al.

(10) Patent No.: US 7,554,997 B1
(45) Date of Patent: Jun. 30, 2009

(54) INTEGRATED ROUTER SWITCH-BASED PORT-MIRRORING MECHANISM FOR MONITORING LAN-TO-WAN AND WAN-TO-LAN TRAFFIC

(75) Inventors: Timothy James Schlichter, Huntsville, AL (US); Roberto Corzo Puon, Madison, AL (US); Amy Joan Puon, legal representative, Madison, AL (US)

(73) Assignee: Adtran, Inc., Huntsville, AL (US)

( * ) Notice: Subject to any disclaimer, the term of this patent is extended or adjusted under 35 U.S.C. 154(b) by 589 days.

(21) Appl. No.: 11/022,957

(22) Filed: Dec. 27, 2004

Related U.S. Application Data

(63) Continuation-in-part of application No. 10/990,697, filed on Nov. 17, 2004.

(51) Int. Cl.
*H04L 12/28* (2006.01)
*G06F 13/20* (2006.01)

(52) U.S. Cl. ........................ 370/402; 710/313
(58) Field of Classification Search .............. 370/236.2, 370/241, 250–253, 327, 340, 395.53; 709/217–218
See application file for complete search history.

(56) References Cited

U.S. PATENT DOCUMENTS

| | | | |
|---|---|---|---|
| 5,588,003 A * | 12/1996 | Ohba et al. ................. | 370/468 |
| 6,246,680 B1 * | 6/2001 | Muller et al. ................ | 370/389 |
| 6,449,251 B1 * | 9/2002 | Awadallah et al. ........... | 370/229 |
| 6,570,875 B1 * | 5/2003 | Hegde ......................... | 370/389 |
| 6,658,457 B2 * | 12/2003 | Nishikawa et al. ........... | 709/206 |
| 2002/0086705 A1 * | 7/2002 | Yokoyama ................... | 455/560 |
| 2003/0223378 A1 * | 12/2003 | Ishwar et al. ................. | 370/254 |
| 2004/0218554 A1 * | 11/2004 | Saint Etienne et al. ....... | 370/276 |
| 2004/0252722 A1 | 12/2004 | Wybenga et al. ............. | 370/474 |
| 2005/0074006 A1 * | 4/2005 | Ambe et al. .................. | 370/390 |
| 2006/0050719 A1 * | 3/2006 | Barr et al. .................... | 370/401 |
| 2006/0059163 A1 * | 3/2006 | Frattura et al. ................ | 707/10 |
| 2006/0095968 A1 * | 5/2006 | Portolani et al. .............. | 726/23 |
| 2006/0143300 A1 * | 6/2006 | See et al. ..................... | 709/227 |

OTHER PUBLICATIONS

Parkhurst, William R.—Cisco OSPF Command and Configuration Handbook—Cisco Press 2002, p. 83, 84 and 97.*

* cited by examiner

*Primary Examiner*—Xavier Szewai Wong
(74) *Attorney, Agent, or Firm*—Allen, Dyer, Doppelt, Milbrath & Gilchrist, P.A.

(57) ABSTRACT

An integrated processor-controlled router and switch fabric architecture provides connectivity between local area network (LAN) ports of an Ethernet switch serving a plurality of local area network users and a wide area network (WAN) port that provides connectivity with the internet. The integrated switch fabric treats the processor interface back to the router as though it were a regular LAN port; as a result, all incoming (WAN-to-LAN) traffic and all outgoing (LAN-to-WAN) traffic relative to the processor interface can be mirrored to any LAN port of the Ethernet switch.

8 Claims, 4 Drawing Sheets

INTEGRATED ROUTER SWITCH-BASED PORT-MIRRORING MECHANISM FOR MONITORING LAN-TO-WAN AND WAN-TO-LAN TRAFFIC

CROSS-REFERENCE TO RELATED APPLICATION

The present application is a continuation-in-part of co-pending U.S. patent application Ser. No. 10/990,697, filed Nov. 17, 2004, by R. Puon et al, entitled: "Integrated Router Switch Containing Mechanism for Automatically Creating IEEE 802.1Q VLAN Trunks for LAN-to-WAN Connectivity," hereinafter referred to as the '697 application, assigned to the assignee of the present application, and the disclosure of which is incorporated herein.

FIELD OF THE INVENTION

The present invention relates in general to telecommunication systems and subsystems thereof, and is particularly directed to the incorporation of a new and improved port-mirroring scheme in an integrated router and switch fabric architecture of the type disclosed in the above-referenced '697 application, that provides the ability to monitor all traffic between a wide area network to which the router side of the architecture is connected, and all local area network ports to which the switch fabric side of the architecture is connected, thereby facilitating network management tasks such as estimating link utilization or troubleshooting network problems.

BACKGROUND OF THE INVENTION

FIG. 1 diagrammatically illustrates a conventional system architecture for providing connectivity between a plurality of user terminals of a local area network (LAN), on the one hand, and a wide area network (WAN), such as the internet, on the other. As shown therein, a plurality of end user communication terminals 110 are connected to associated ports 121 of an Ethernet-based distribution switch 120. (Although the block diagram of FIG. 1 depicts only four user terminals 110 connected to the Ethernet-based distribution switch 120, it will be realized that in actuality the number of user terminals can be expected to be in the thousands; only four are shown in order to reduce the complexity of the illustration.)

Switch 120 is typically configured as a managed, layer-two Ethernet switch, and is coupled to a processor (CPU 125)-controlled switch fabric chip 130 (such as a Broadcom BCM5645 Strataswitch) within a managed Ethernet switch subsystem 100. In the WAN direction, the switch fabric chip 130 is further coupled to an Ethernet port 140. Ethernet port 140 is coupled by way of a communication link 150 (configured as an IEEE 802.1Q trunk link) to an associated Ethernet port 201 of a layer-three edge router subsystem 200.

Within the layer-three edge router subsystem 200, the Ethernet port 201 is coupled to the router's communication control processor chip (CPU) 210 (such as a Freescale MPC866 chip) which, in turn, is coupled to a wide area network (WAN) port 220. WAN port 220 provides a digital communication interface to a wide area network such as the internet 230, and to a dialed back-up unit 240, that provides auxiliary connectivity to public switched telephone network 250.

In order to accommodate data traffic among a large number of user terminals, advantage is taken of the ability of the managed layer-two Ethernet distribution switch 120 to subdivide the LAN into multiple virtual LANs (VLANs). This increases the efficiency of the network by reducing the broadcast traffic load, as each VLAN provides virtual isolation of traffic between itself and other VLANs. Once traffic intended for the internet leaves a VLAN, it is the task of the layer-three edge router subsystem to route the traffic from the VLAN to the WAN.

An additional feature of the managed layer-two Ethernet distribution switch 120 of the system of FIG. 1 is its ability to monitor incoming and outgoing traffic on its Ethernet ports, through a technique commonly referred to as "port-mirroring". Pursuant to this technique, a monitoring (or 'mirrored to') workstation (e.g., personal computer) 260 is coupled to a prescribed port (e.g., port 1) of the Ethernet switch 120, and the switch is configured to 'mirror' or copy all traffic passing through a preselected ('monitored from') LAN port (e.g., port 12) of the switch to the monitoring port, such as for monitoring link utilization or troubleshooting network problems. It would be desirable to extend this capability to only monitor traffic destined for or originating from the WAN port 220. However, because the router and the Ethernet switch subsystems are mutually isolated, there is no WAN port in the Ethernet switch subsystem, so it is only possible to monitor traffic associated with the LAN ports.

This may be appreciated by an examination of the signal interfacing functionality of the architecture of FIG. 1, wherein the managed switch 100 and the edge router subsystem 200 are tied together by way of an IEEE 802.1Q VLAN trunk, which is the physical link that transports information from multi VLANs to the WAN and vice versa. In accordance with the communication protocol employed by this architecture, each frame traversing the trunk has a VLAN tag prepended to the frame, so that traffic from one VLAN is distinguishable from traffic from all other VLANs. In the conventional system of the type shown in FIG. 1, the user (system manager) is required to configure the VLAN trunk on both sides of the link 150 before traffic can flow from each VLAN to the WAN. This is a time-consuming and tedious task, that is prone to errors, particularly as the number of user terminals and VLANs increases.

Advantageously, pursuant to the invention detailed in the above-referenced '697 application, this and other shortcomings of conventional segregated router—managed switch systems of the type shown in FIG. 1 are effectively obviated by integrating the router and switch functions into a combined architecture of the type shown in FIG. 2. In accordance with this integrated router-switch architecture, throughput connectivity is provided between local area network (LAN) ports serving a plurality of local area network users and a wide area network (WAN) port that provides connectivity with the internet, by automatically creating IEEE 802.1Q virtual local area network (VLAN) trunks in response to a reduced set of command inputs.

More specifically, as in the segregated system architecture of FIG. 1, the integrated system architecture of FIG. 2 contains a (managed layer-two) Ethernet-based distribution switch 120, for providing connectivity between a plurality of user communication terminals 110 of a local area network and a switch fabric chip 130. (Again, as in the system diagram of FIG. 1, only four user terminals 110 are shown in FIG. 2, in order to reduce the complexity of the drawings, it being understood that in actuality the number of user terminals can be expected to be in the thousands. Also, as in the architecture of FIG. 1, switch fabric chip 130 may comprise a Broadcom BCM5645 Strataswitch.

In the integrated architecture of FIG. 2, rather than being connected to a single user configurable Ethernet port through which access to a dedicated physical link to a further single user configurable Ethernet port in a separate router subsystem is afforded, the switch fabric chip 130 is coupled to a PCI bus 300 within the router/switch unit, through which communications with communication control processor chip (CPU) 210 are provided. As in the router subsystem 200 of FIG. 1, communication control processor chip 210 may comprise a Freescale MPC866 processor chip. The communication control processor chip 210, in turn, is coupled to a wide area network port 220, that provides a digital communication interface to the internet 230, and to a dialed back-up unit 240, that provides auxiliary connectivity to the public switched telephone network 250.

In addition, as in the system of FIG. 1, the managed layer-two Ethernet distribution switch 120 is used to subdivide the LAN into multiple virtual LANs (VLANs), with each VLAN providing virtual isolation of traffic between itself and other VLANs. Once traffic intended for the internet leaves a VLAN, it is the job of the integrated switch fabric/router to route the traffic from the VLAN to the WAN. However, unlike the architecture of FIG. 1, the switch fabric chip 130, which provides access to the VLANs, and the control processor 210, which performs the function of the edge router, are not isolated subsystems that are tied together by way of a dedicated physical IEEE 802.1Q VLAN trunk link. Instead, they are interfaced with each on the same motherboard with means of the PCI bus.

Pursuant to the invention disclosed in the '697 application, a virtual IEEE 802.1Q VLAN trunk link, that is functionally equivalent to the dedicated physical IEEE 802.1Q VLAN trunk link in the system of FIG. 1, is automatically created in response to the user issuing a prescribed set of commands to the communication control processor. These commands may be supplied to the control processor by way of a dial-up telecommunication link through the PSTN (DBU port) or by way of a web page browser via the internet (WAN port). The user commands and the responses they invoke are set forth in the state diagram example of FIG. 3, which shows the manner a SWITCH VLAN table is loaded with a pair of VLAN entries (x and y), and the CPU and SWITCH TAGGING states are loaded with tag entries supplied by the user.

Referring to FIG. 3, the system is initially in an IDLE state 301. In this state, a VLAN table that is maintained within the switch fabric chip 130 is empty, as shown by the variable: SWITCH_VLAN_TABLE=EMPTY, Consequently, as shown by the variable: SWITCH_INSERTS_TAGS=NO, the switch fabric chip is not tagging packets destined for the control processor chip 210; also, as shown by the variable: CPU_INSERTS_TAGS=NO, control processor chip 210 is not tagging packets destined for the switch fabric chip 130.

With the system in its idle state 301, the user proceeds to enter the command "int vlan x" (where x is the VLAN number of the Ethernet port of interest for a prescribed user terminal). In response to this command, the control processor transitions to the CREATE VLAN state 302. In this state, the VLAN table in the switch fabric is updated with the number of the new VLAN that has been created by the user input command. Since the user has supplied the identification of a VLAN, that VLAN number is written into the VLAN table maintained in the switch fabric chip, by the processor performing the function of the variable: SWITCH_VLAN_TABLE=Vlan x. Since the processor chip is not yet tagging packets, the variable CPU_INSERTS_TAGS=NO, and since the switch fabric is not yet tagging packets, the variable SWITCH_INSERTS_TAGS=NO.

The user then enters the command "no shutdown", which initiates CPU TAGGING state 303 and SWITCH TAGGING state 304. In particular, in the CPU TAGGING state 302, the processor begins tagging packets destined for the switch fabric with the particular VLAN number that was created by the user. Here, the processor inserts the tag information supplied to the tag table, as denoted by the variable: CPU_INSERTS_TAGS=YES (vlan x). Since switch fabric tagging has not yet begun, the variable SWITCH_INSERTS_TAGS=NO. From CREATE VLAN state 301, the variable SWITCH_VLAN_TABLE=Vlan x.

In the SWITCH TAGGING state 304, the switch fabric begins tagging packets destined for the CPU with the particular VLAN number that has been supplied by the user. Thus, the variable: SWITCH_INSERTS_TAGS=YES (vlan x). Also, from the previous two states 302 and 303, the variable: CPU_INSERTS_TAGS=YES (vlan x) and the variable: SWITCH_VLAN_TABLE=Vlan x. With the variables of the CPU and SWITCH TAGGING states loaded with numerical Vlan identifications, traffic flowing between the control processor (CPU) and the switch fabric will have a VLAN tag appended to the frames as defined in IEEE 802.1Q. However, the process of performing the tagging and complying with IEEE 802.1Q has been accomplished without the user having to set all the variables. Loading of the requisite variables for the CPU and SWITCH tagging states has been performed automatically. Namely, the task of creating the IEEE 802.1Q VLAN trunk is no longer carried out by the user, but rather by the communication control processor.

In the example of configuring a LAN-to-WAN connection for a pair of VLANs, as the completion of the SWITCH TAGGING state 304, the user enters a new vlan tag command having a new vlan number (y) as: "int vlan y, (where y is the VLAN number of the Ethernet port of interest for another prescribed user terminal). In response to this command, the control processor transitions to the next CREATE VLAN state 305. As was the case for state 302, in CREATE VLAN state 305, the VLAN table in the switch fabric is updated with the new VLAN number that has been created by the user command. In particular, the new VLAN number (y) is written into the VLAN table maintained in the switch fabric chip, by the processor performing the function of the variable: SWITCH_VLAN_TABLE=Vlan x, y. Since the processor chip has begun tagging packets, the variable CPU_INSERTS_TAGS=YES (vlan x), and the variable SWITCH_INSERTS_TAGS=YES (vlan x).

Next, the user again enters the command "no shutdown", which initiates CPU TAGGING state 306 and SWITCH TAGGING state 307. In CPU TAGGING state 306, the processor inserts new tag information supplied to the tag table, as denoted by the variable: CPU_INSERTS_TAGS=YES (x, y). Since switch fabric tagging has begun, the variable SWITCH_INSERTS_TAGS=YES (x). From state CREATE VLAN state 305, the variable SWITCH_VLAN_TABLE=Vlan x, y.

Finally, in the SWITCH TAGGING state 307, wherein the switch fabric tags packets destined for the CPU with the particular VLAN numbers supplied by the user, the variable: SWITCH_INSERTS_TAGS=YES (x, y). Also the variable: CPU_INSERTS_TAGS=YES (x, y) and the variable: SWITCH_VLAN_TABLE=Vlan x, y.

From the foregoing description of FIGS. 2 and 3, it will be readily appreciated that the integrated router and switch fabric architecture of the '697 application has two essential aspects that differentiate it from the prior art system of FIG. 1. The first is the fact that it has no physical trunk between the switch fabric and the router. Instead, a virtual IEEE 802.1Q trunk is created through software to provide connectivity between the switch fabric and the router's control processor. This means that the integrated switch fabric treats the processor interface back to the router just like a regular LAN port.

Secondly, the virtual IEEE 802.1Q trunk is automatically generated by the router's control processor whenever a VLAN interface is created, by the user initiating the configuration of a LAN-to-WAN connection from a particular VLAN. All traffic flowing over this link have VLAN tags appended to the frames as defined in accordance with IEEE 802.1Q protocol.

SUMMARY OF THE INVENTION

In accordance with the present invention, advantage is taken of the above-described features of the integrated system of FIG. 2, in order to provide a mechanism for monitoring all traffic between the wide area network to which the router side of the architecture is connected, and all local area network ports to which the switch side of the architecture is connected. Thus all traffic monitoring capability is due to the fact that, as described above, the integrated switch fabric treats the processor interface back to the router as though it were a regular LAN port. As a result, all incoming (WAN-to-LAN) traffic and all outgoing (LAN-to-WAN) traffic relative to the processor interface can be readily mirrored to any of the LAN ports of the layer-two Ethernet switch.

DETAILED DESCRIPTION

Figure 1:
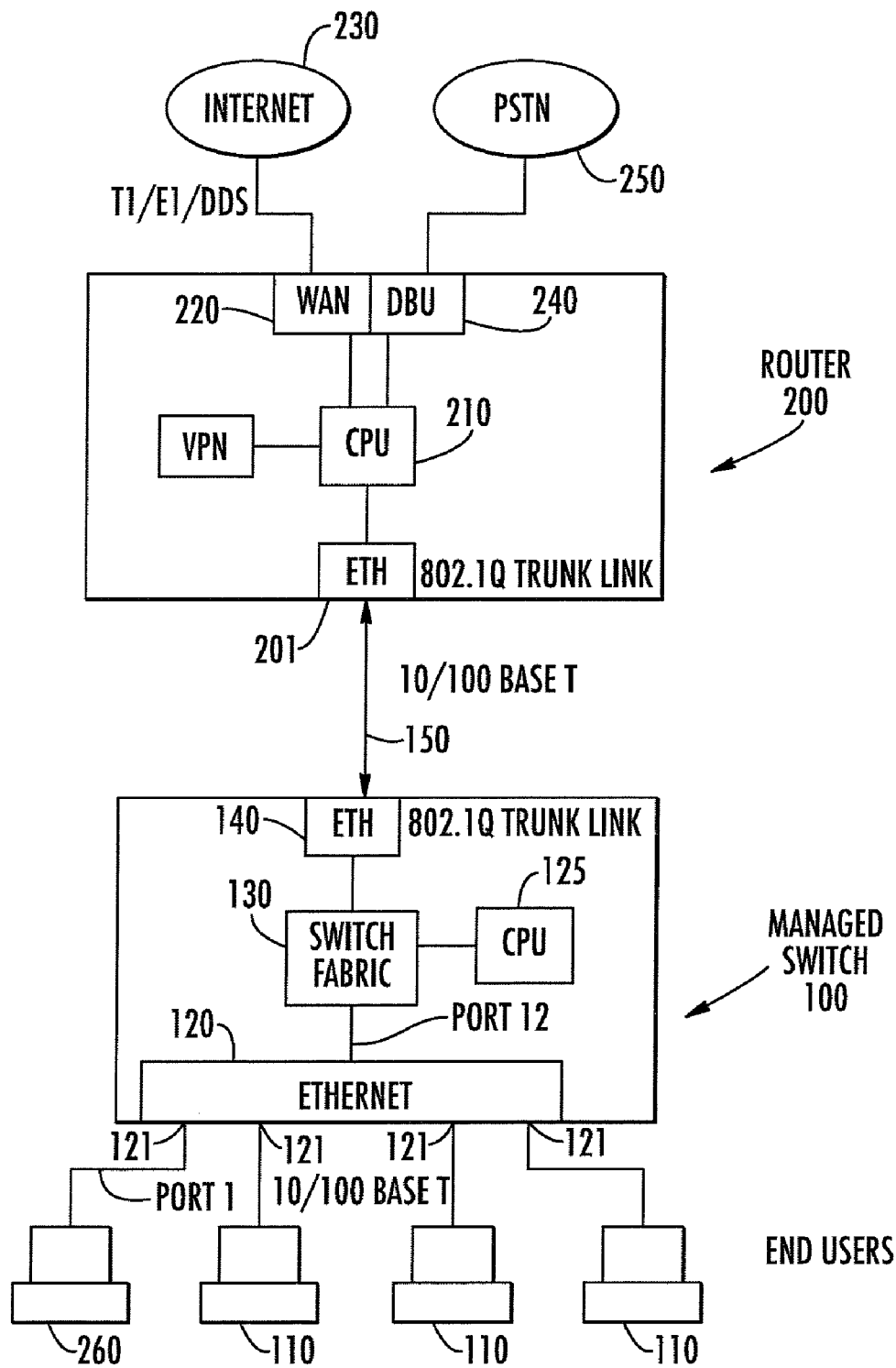
FIG. 1 is a reduced complexity block diagram of a conventional system architecture for providing connectivity between a plurality of user terminals of a local area network and the internet.

Before describing the integrated router switch-based port-mirroring mechanism for monitoring LAN-to-WAN and WAN-to LAN traffic in accordance with the present invention, it should be observed that the invention resides primarily in a prescribed novel combination of conventional digital communication chip sets and control software therefor, as detailed in the above-referenced '697 application. Consequently, the configurations of such chip sets and the manner in which they may be interfaced with conventional communication interface components and circuits have, for the most part, been shown in the drawings by readily understandable schematic block diagrams, which show only those specific aspects that are pertinent to the present invention, so as not to obscure the disclosure with details which will be readily apparent to those skilled in the art having the benefit of the description herein. Thus, the block diagram of FIG. 4 is primarily intended to show the major components of an embodiment of the invention in a convenient functional grouping, whereby the present invention may be more readily understood.

Figure 2:
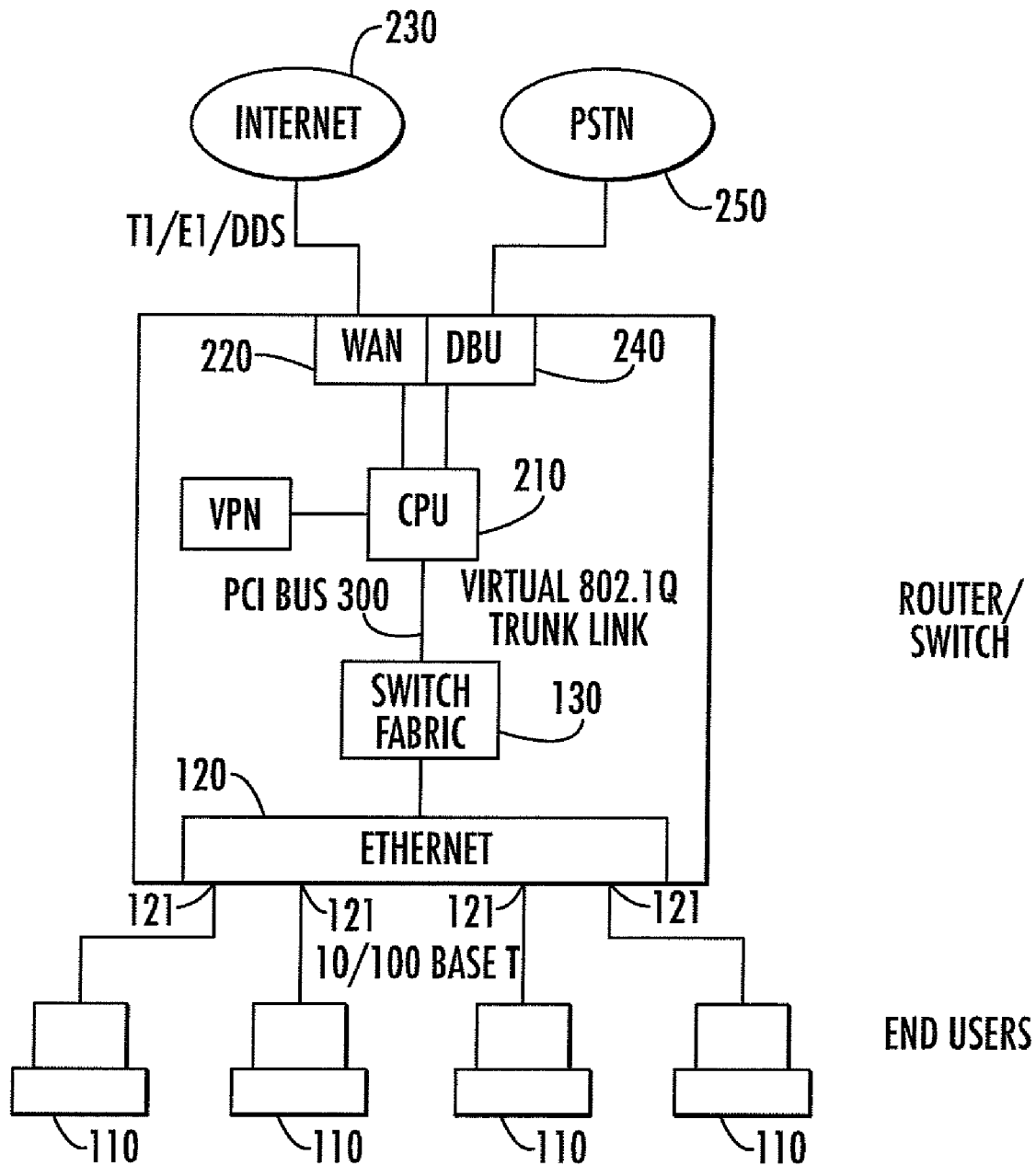
FIG. 2 is a reduced complexity block diagram of an integrated switch fabric—router system architecture in accordance with the present invention.
Figure 3:
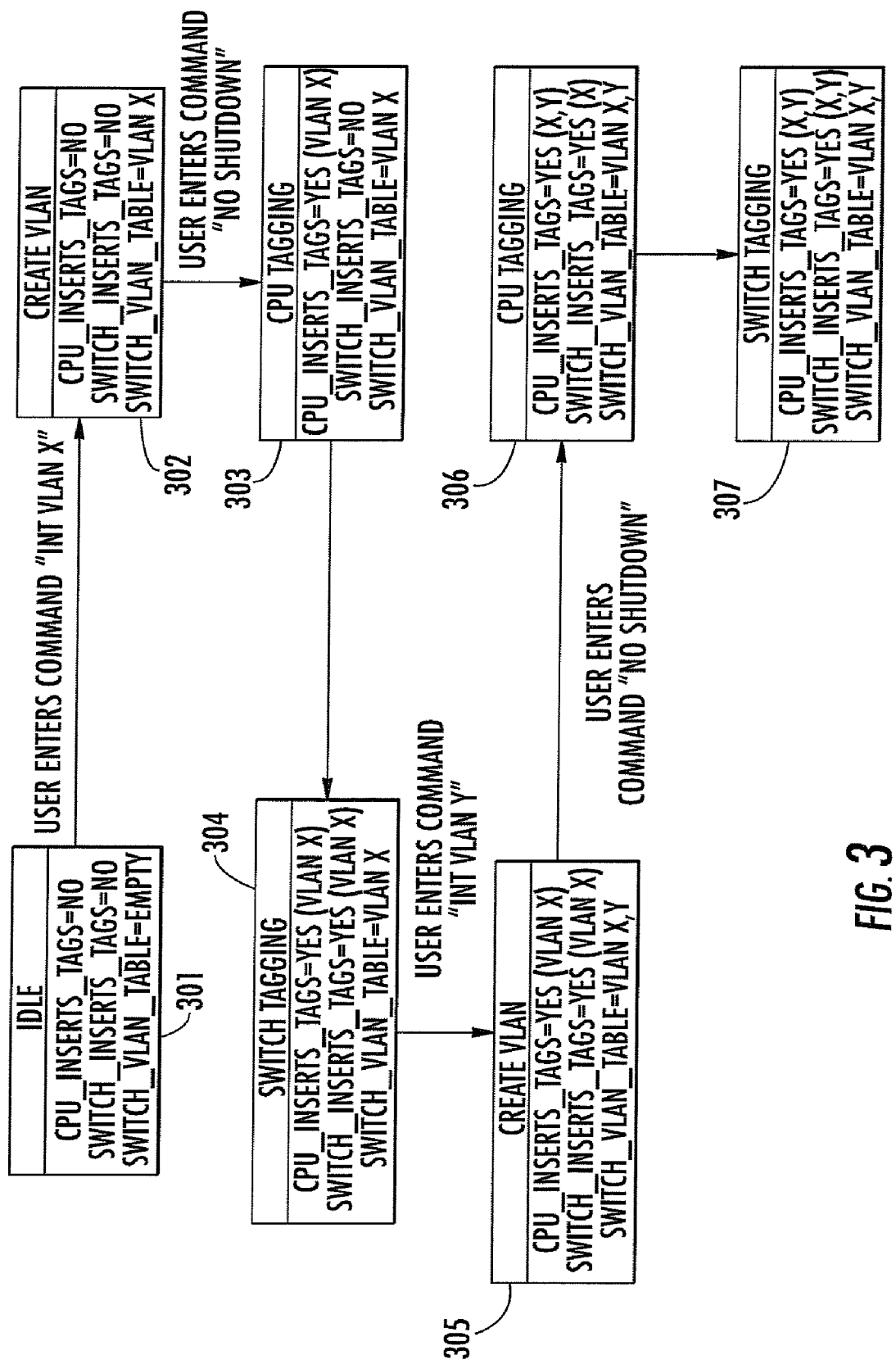
FIG. 3 is a state diagram shown the manner in which IEEE 802.1Q trunks are automatically created in response to prescribed user inputs in accordance with the present invention.
Figure 4:
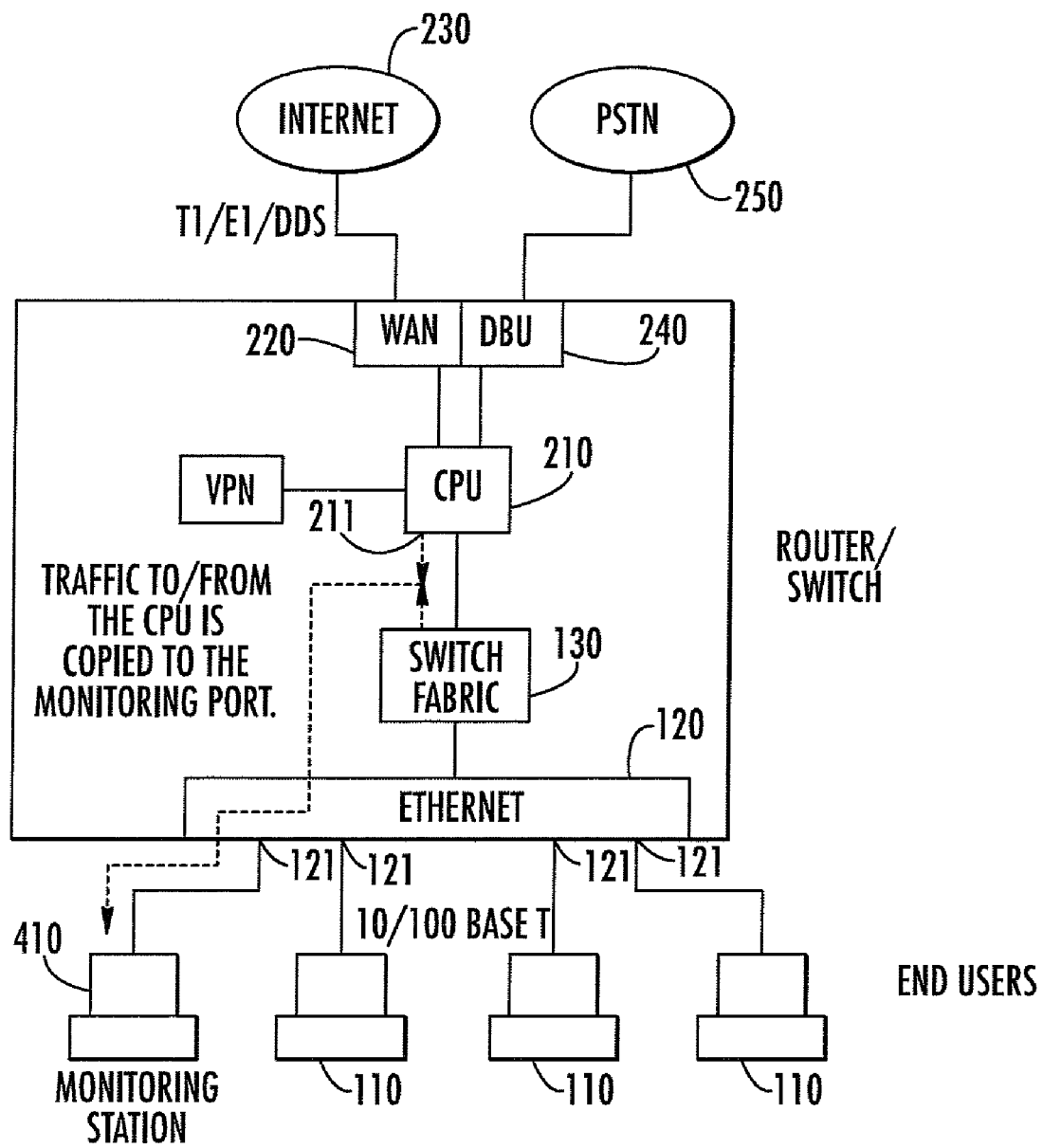
FIG. 4 diagrammatically illustrates the manner in which a monitoring station may be coupled to one of the LAN ports of the Ethernet switch of the integrated switch fabric—router system architecture of FIG. 2 to monitor WAN-to-LAN and LAN-to-WAN traffic, as routed through the router-switch's control processor.

Attention is now directed to the FIG. 4, which shows the manner in which the integrated router-switch system architecture of FIG. 2 may be used to monitor all incoming and outgoing traffic passing through the system's communications control processor (CPU) 210. In particular, just as in the conventional segregated router and switch system of FIG. 1, a (mirrored to) communication monitoring workstation (such as a personal computer) 410 is coupled to any prescribed port (e.g., port 1) of the layer-two Ethernet switch. In accordance with the invention, however, rather than designating one of the other LAN ports of the Ethernet switch 120 as the 'mirroring from' port, it is the CPU port 211, to which the switch fabric chip 130 is coupled, that is designated as the mirroring port. Since all incoming (WAN-to-LAN) traffic and all outgoing (LAN-to-WAN) traffic passes through the CPU-switch fabric port, then whatever traffic is originated by or destined for any user terminal (LAN port) that traverses the CPU-switch fabric port will be mirrored to the monitoring workstation 410. Examples of this all traffic monitoring capability include monitoring the WAN link to allow the utilization of the WAN link to be estimated, and the link may be monitored for unexpected traffic flows.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed:

1. A system for monitoring packetized data traffic between user terminals of a local area network (LAN) and a wide area network (WAN) interface to the internet, said system comprising an integrated router and switch fabric architecture;

an Ethernet switch having a plurality of ports that are adapted to be coupled to said user terminals of said LAN;

a processor and switch fabric coupled to said Ethernet switch and being operative to route packets from said Ethernet switch as sourced thereto from user terminals to said processor for delivery to said WAN interface, and to route packets supplied thereto to said Ethernet switch for delivery via ports thereof to destination user terminals and said processor is connected directly between said switch fabric and said WAN interface and further comprising a motherboard on which the processor and switch fabric are positioned and a Peripheral Component Interconnect (PCI) bus interfacing the processor and switch fabric; and a monitoring terminal coupled to one of said plurality of ports of said Ethernet switch, and being operative to monitor all traffic between said WAN interface and said plurality of ports of said Ethernet switch, wherein said Ethernet switch is operative to mirror all traffic between said WAN interface and said plurality of ports of said Ethernet switch to said monitoring terminal, wherein connectivity between said processor and said switch fabric is established by way of a virtual trunk link therebetween wherein the processor and switch fabric are automatically configured by the processor in response to virtual LAN (VLAN) address-containing user commands to insert VLAN tags into frames, wherein the VLAN tags correspond to VLAN data that identify VLAN's for transport of communications signals transported from the router to the switch fabric and from the switch fabric to are router and used by said processor for updating a new VLAN and for tagging packets wherein requisite variables for VLAN tags are performed automatically from the processor, and said processor includes a port to which the switch fabric is coupled and designated as a mirroring port.

2. The system according to claim 1, said virtual trunk link is automatically configured by said processor in response to virtual LAN (VLAN) address-containing user commands.

3. The system according to claim 1, wherein said virtual trunk link is an IEEE 802.1Q VLAN trunk link.

4. The system according to claim 1, wherein said processor-based router and said switch fabric are automatically configured by said processor in response to virtual LAN (VLAN) address-containing user commands, to insert VLAN tags into frames of communication signals transported from said router to said switch fabric, and from said switch fabric to said router.

5. A method of monitoring packetized data traffic routing connectivity between user terminals of a local area network (LAN) and a wide area network (WAN) interface to the internet using an integrated router and switch fabric architecture, said method comprising the steps of:
   (a) interfacing a plurality of ports of an Ethernet switch with said user terminals;
   (b) coupling said Ethernet switch to a switch fabric that is operative to route packets from said Ethernet switch as sourced thereto from said user terminals to a processor for delivery to said WAN interface, and to route packets supplied thereto from said router to said Ethernet switch for delivery via ports thereof to destination user terminals wherein said processor is connected directly between said switch fabric and said WAN interface and further comprising a motherboard on which the processor and switch fabric are positioned and a Peripheral Component Interconnect (PCI) bus interfacing the processor and switch fabric; and
   (c) monitoring all packetized data traffic between said WAN interface and said plurality of ports of said Ethernet switch by way of a monitoring terminal coupled to one of said plurality of ports of said Ethernet switch, wherein the step of monitoring comprises mirroring all traffic between said WAN interface and said plurality of ports of said Ethernet switch to said monitoring terminal wherein the step of monitoring further comprises establishing connectivity between said processor-based router and said switch fabric by way of a virtual VLAN trunk link therebetween wherein the processor and switch fabric are automatically configured by the processor in response to virtual LAN (VLAN) address-containing user commands to insert VLAN tags into frames, wherein the VLAN tags correspond to VLAN data that identify VLAN's for transport of communications signals transported from the router to the switch fabric and from the switch fabric to the router and used by said processor for updating a new VLAN and for tagging packets wherein requisite variables for VLAN tags are performed automatically from the processor, and said processor includes a port to which the switch fabric is coupled and designated as a mirroring port.

6. The method according to claim 5, wherein the step of monitoring includes causing said processor to automatically configure said virtual trunk link in response to virtual LAN (VLAN) address-containing user commands.

7. The method according to claim 6, wherein said virtual trunk link is an IEEE 802.1Q VLAN trunk link.

8. The method according to claim 5, wherein said processor-based router and said switch fabric are automatically configured by said processor in response to virtual LAN (VLAN) address-containing user commands, to insert VLAN tags into frames of communication signals transported from said router to said switch fabric, and from said switch fabric to said router.

* * * * *